INVENTOR
ALBERT O. ROBERTS

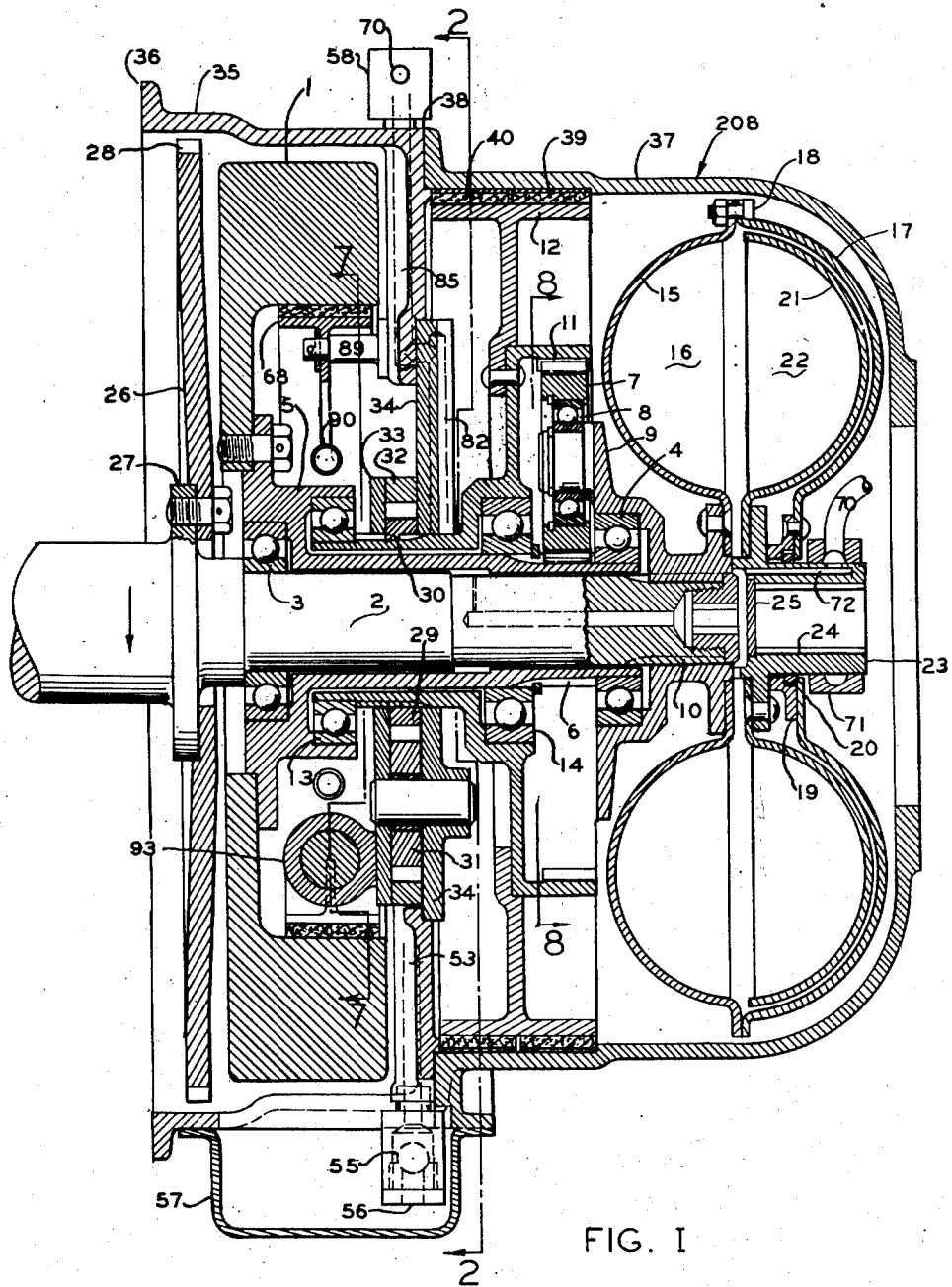
FIG. I
INVENTOR
ALBERT O. ROBERTS
BY Arthur M. Smith
ATTORNEY

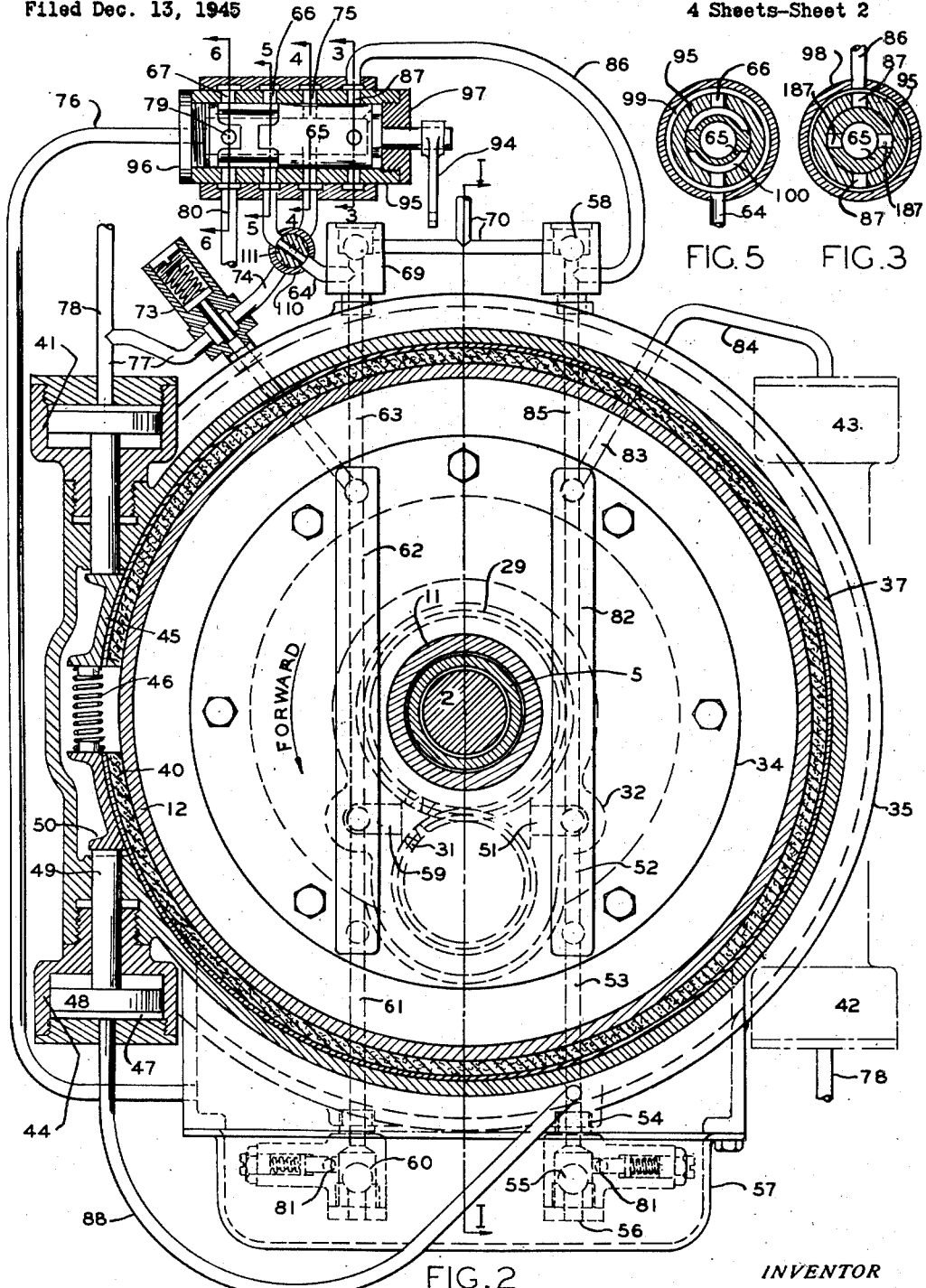

BY
ATTORNEY

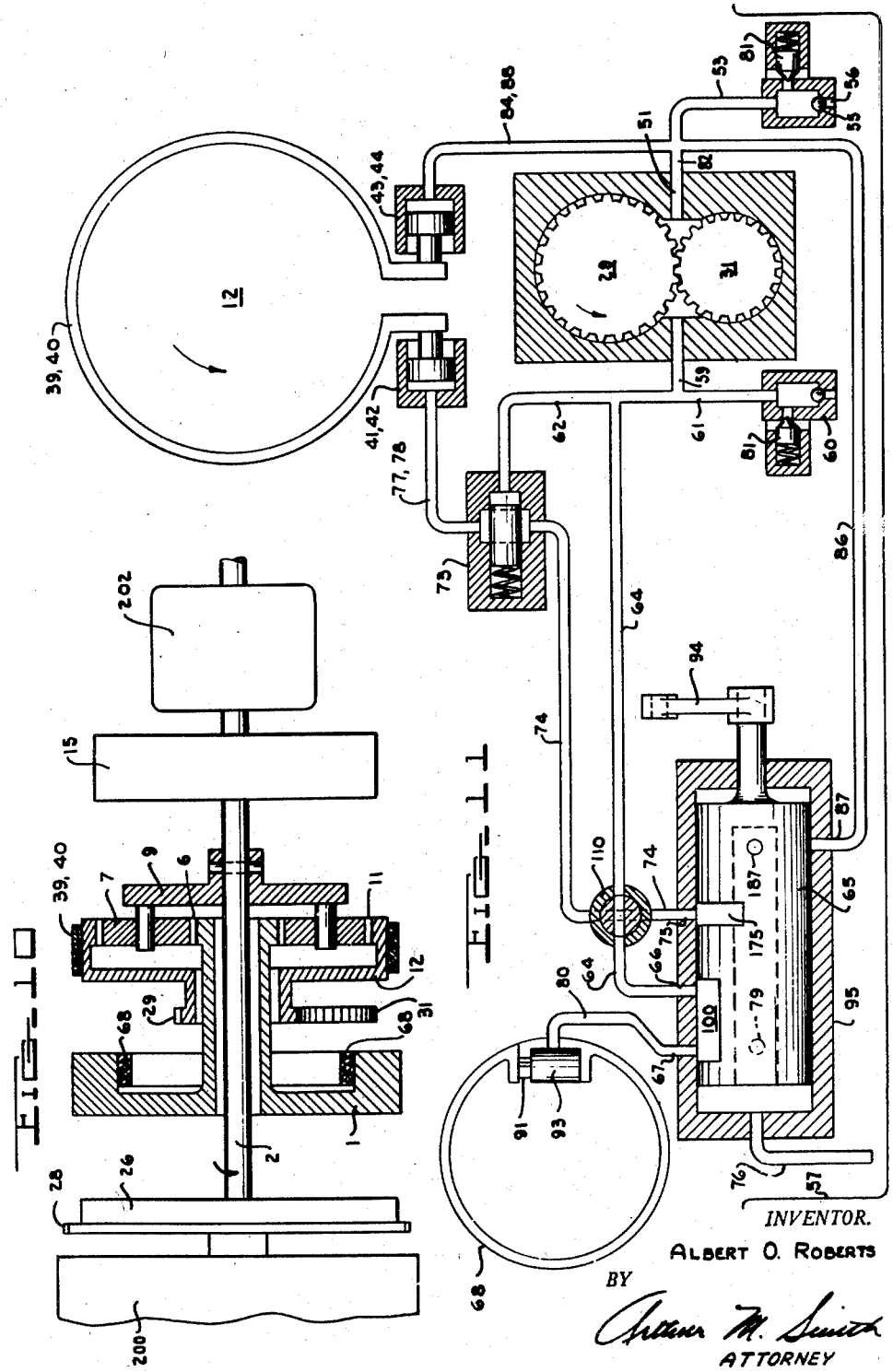

Patented Oct. 17, 1950

2,525,946

UNITED STATES PATENT OFFICE 2,525,946

POWER RECLAIMER

Albert O. Roberts, Dearborn, Mich.

Application December 13, 1945, Serial No. 634,856

16 Claims. (Cl. 74—751)

This invention relates to power reclaimers for motor propelled vehicles, and has particular reference to a means associated with the drive system of the vehicle and operable for absorbing a part of the kinetic energy of a decelerating vehicle, storing such energy, and subsequently releasing such stored energy to the drive system of a vehicle for accelerating the same. It is particularly applicable to any relatively heavy moving mechanism whose cycle of operation includes its deceleration and acceleration at frequently occurring intervals.

In the operation of motor vehicles, power is lost as heat energy when the brakes are applied for decelerating or stopping the vehicle. This invention contemplates the provision of a means which is associated with the drive system of a vehicle and operable for automatically storing kinetic energy of the vehicle which may be absorbed therefrom during deceleration of the vehicle. It further contemplates a control which is coordinated with the normal operation of the vehicle so that energy is automatically absorbed from the vehicle during the deceleration thereof, and automatically returned to the drive system of the vehicle when it is desired to accelerate it.

When used in connection with a motor vehicle, as for example an automobile or bus, it will provide many desirable advantages, among which are the following:

The power reclaimer embodying the invention is constructed and arranged to provide a moderate amount of braking for the vehicle the instant the accelerator or throttle is released, and under some decelerating conditions it will be unnecessary for the operator of the vehicle to apply the usual vehicle brakes.

The power reclaimer is constructed and arranged to supply energy to the drive system of the vehicle so that when the vehicle is being accelerated the power reclaimer will help to accelerate the vehicle faster than it would be possible to do with the engine alone. This would be particularly useful and noticeable in connection with buses and trucks where the power of the engine is relatively low with respect to the mass of the vehicle. Passenger cars equipped with this device could be made to give the same performance with a smaller and more economical engine.

The power reclaimer also is constructed and arranged so that it may be employed to start the engine if the same should stop.

The use of a power reclaimer also would make possible the elimination of the idle setting of the carburetor so that the motor of the engine could come to a stop when the vehicle is stopped, the power reclaimer functioning to start the engine upon opening of the throttle.

In connection with cars equipped with fluid couplings, the "creep" usually present in these cars could be eliminated by the use of the power reclaimer.

The use of this device would also function to improve gasoline economy of the engine, as the power usually lost during braking or decelerating can be stored and returned to the drive system to aid in propelling the vehicle.

This device would also make it unnecessary to use a low speed gear for accelerating purposes without sacrificing any accelerating performance, while at the same time simplifying the work of the operator in accelerating the vehicle and reducing the wear and tear of the engine and drive system that accompanies high speed engine operation in low gear for accelerating purposes.

Principal objects of the invention, therefore, are to provide:

A mechanism whereby a part of the kinetic energy of a decelerating vehicle may be stored up and used later to accelerate the vehicle;

A means of storing up power generated by the engine while the vehicle is at rest and for delivering the accumulated and stored power to the drive system of the vehicle to assist the engine in starting the vehicle;

A motor vehicle having a throttle control mechanism whereby a part of the kinetic energy of a decelerating vehicle may be stored upon closing of the throttle during deceleration of the vehicle and subsequently used upon opening of the throttle to aid in accelerating the vehicle;

A motor vehicle having an energy absorbing and storing means which is constructed and arranged so as to provide the motor vehicle with one or more of the advantages hereinbefore set forth.

Other and further objects of the invention will be apparent from the following description and claims and will be understood by reference to the accompanying drawings, of which there are three sheets, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings

Fig. 1 is a longitudinal, sectional view of a part of a device embodying the invention and taken generally along the line 1—1 of Fig. 2;

Fig. 2 is a cross sectional view taken generally along the line 2—2 of Fig. 1, looking in the direction of the arrows, together with a sectional view of the control valve of the device;

Figure 7:
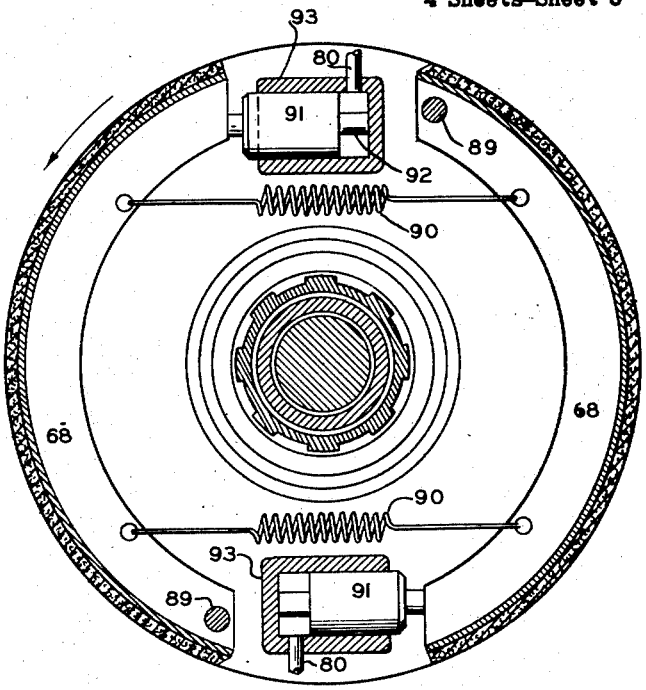
Figures 8, 9:
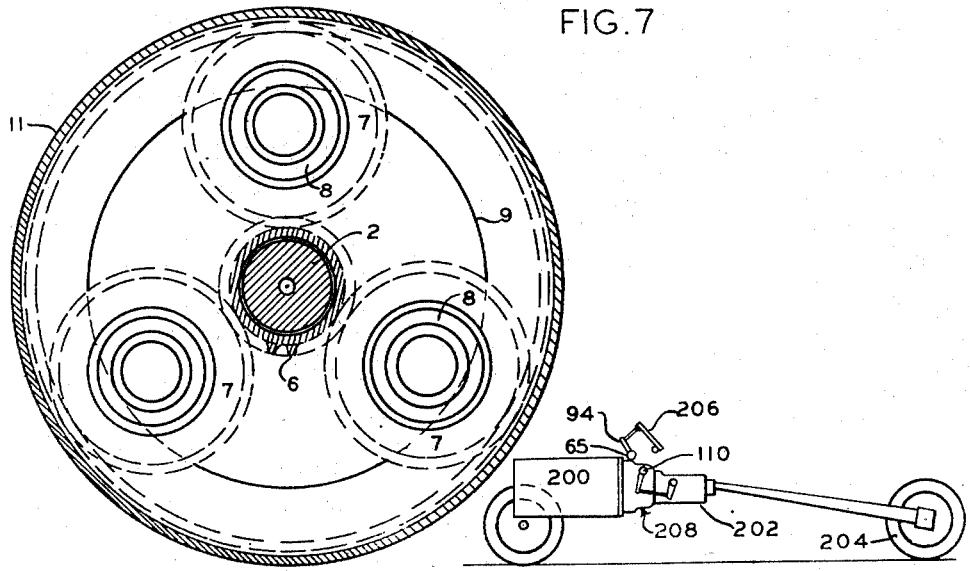

Figs. 3, 4, 5 and 6 are sectional views of the control valve along the lines 3—3, 4—4, 5—5 and 6—6 respectively of Fig. 2;

Fig. 7 is a fragmentary sectional view of the flywheel braking means taken generally along the line 7—7 of Fig. 1;

Fig. 8 is a sectional view illustrating the planetary gear train taken generally along the line 8—8 of Fig. 1; and Fig. 9 is a diagrammatic view of a motor vehicle chassis having a drive system embodying the present invention.

Fig. 10 is a schematic diagram illustrating the power reclaimer gear train and the drive system.

Fig. 11 is a schematic diagram of the hydraulic system for automatically controlling the operation of the power reclaimer.

In the embodiment of the invention selected for purposes of illustration, a power reclaimer is shown as forming part of an engine driven automotive vehicle, but it is contemplated that the power reclaimer may be applied to any type or kind of motor propelled vehicle, or other mechanism whose mass is subjected to deceleration and acceleration at recurrent intervals.

As shown in Fig. 9, a motor propelled vehicle embodying a drive system of the invention comprises a motor 200 and drive system including a transmission 202 for transmitting power from the motor of the vehicle to the propelling means thereof which, in the present instance, comprises the road wheels 204. The motor 200 may be of the internal combustion type and includes a conventional throttle or accelerator 206 which functions to control the fuel supply to the engine and thereby the speed thereof.

The throttle 206 normally is in what might be termed its closed position, and in which position of the throttle the engine will idle. As the throttle 206 is opened, the fuel supply to the engine will be increased and consequently the speed of the engine will be increased, depending upon the load to which it is subjected.

The term "idling" as used herein with reference to the condition of the engine is meant to include the condition of the engine either at rest or at low idling speeds, because, as previously explained, with the use of the invention it is possible that the engine might be allowed to come to rest when the accelerator or throttle is closed. This would be true if the engine were of a different type, such as a steam engine or electric motor.

The power reclaimer 208, according to the construction herein disclosed, is arranged between the engine 200 and the transmission 202. The transmission, incidentally, may be of any suitable type and include manually operable or controlled means by which the transmission may be set so that the engine will drive the vehicle forwardly or reversely, although in applications where only unidirectional driving is required the reverse arrangement might be omitted.

The power shaft 2 of the motor 200 projects into the casing or housing for the power reclaimer 208 and is provided with splines 10. The hub of a planet carrier 9 is internally splined and secured by means of the splined portion 10 of the shaft 2 to the shaft so as to rotate therewith.

A fluid coupling driving member 15 is fixedly secured to the hub of the planet carrier 9. A fluid coupling cover 17 at its outer periphery is bolted by means of a series of bolts 18 to the outer periphery of the fluid coupling driving member 15. The fluid coupling driven member 21 is fixedly mounted on a hub 23 which is internally splined as indicated at 24. The hub 23 is adapted to be splined to a spline shaft of a transmission or drive system so that power from the engineer may be transmitted from the shaft 2 through the fluid coupling to the drive system and the propelling means of the vehicle.

The driven member 21 is provided with radially disposed vanes 22, while the driving member 15 is provided with radially disposed vanes 16 so that upon rotation of the engine the driving member 15 will be operative to transmit power to the driven member 21 and during coasting of the vehicle the driven member 21 will be operative to transmit power to the driving member 15. Fluid under pressure is supplied to the fluid coupling through the supply line 70 thereby insuring an adequate supply of fluid to the coupling at all times.

A seal ring retainer 19 which is carried by the cover 17 of the fluid coupling cooperates with the periphery of the fluid coupling cover 17 around the hole therein to define a groove for a seal ring 20 which is of a construction like a piston ring so as to form a seal between the fluid coupling cover 17 and the outside of the hub 23 which will rotate a certain amount relative to each other due to slippage between the driving and driven parts of the fluid coupling.

A flywheel 1 is carried by a hub 5 which is freely rotatably journaled in bearings 3 and 4, the bearing 3 being carried directly by the shaft 2, while the bearing 4 is arranged in a seat in the hub of the planet carrier 9. The mass of the flywheel 1 is considerable. The flywheel 1 is accelerated as hereinafter disclosed for the purpose of absorbing and storing energy from the drive system of the vehicle during the deceleration thereof. One end of the flywheel hub 5 is formed to provide a spur gear 6 which comprises the sun gear of a planetary gear train which includes the planet gears 7 and the ring gear 11.

The planet gears 7 are rotatably journaled on spindles projecting axially from the planet carrier 9. The teeth of the planet gears 7 mesh with the teeth of the ring gear 11 and the sun gear 6. The ring gear 11 has a brake drum 12 fixedly secured thereto. The gear 11 and drum 12 are rotatably journaled on the flywheel hub 5 by means of the ball bearings 13 and 14.

The power shaft 2 of the engine has the usual flange 27 to which the engine flywheel 26 is bolted, such flywheel being provided with teeth 28 for engagement by the teeth of the engine starter.

A pump comprising gears 29 and 31 is provided, the gear 29 being splined at 30 on the splines of the hub which supports the ring gear 11 and brake drum 12, while the gear 31 is rotatably mounted on a shaft which is mounted on the plate 34, the plate 34 forming one end wall of the pump. The pump additionally includes opposite wall 33 and housing 32 which is clamped between the end walls 33 and 34 of the pump. The teeth of the gear 31 mesh with the teeth of the gear 29 so that the two gears will be driven at the same time but in opposite directions and by the common hub of the brake drum 12 and ring gear 11.

The plate 34 is bolted, as shown in Fig. 2, to an inwardly projecting web of the stationary flywheel housing 35. The front face of the housing 35 is bolted to the rear face of the engine at 36. The coupling housing 37 is bolted to the flywheel housing 35 at 38. The flywheel and coupling housings define the casing of the power reclaimer. It will thus be seen that the flywheel 1 is connected to the sun gear 6 of the planetary gear train so as to rotate therewith; that the brake drum 12 is connected to the ring gear 11 so as to rotate therewith; and that the driving member 15 of the fluid coupling is connected to the planet carrier 9 so as to rotate therewith.

Braking means are provided for the drum 12 and the flywheel 1 so that the rotation of each of them may be controlled or prevented. Braking means for the drum 12 comprise like brake bands 39 and 40 which are fitted into the housing 37 and are arranged to apply a braking force on the drum 12 when actuated by the brake cylinders 41, 42, 43 and 44. Each of the brake bands is normally maintained open or released by means of a spring 46, such as that illustrated in Fig. 2 in connection with the band 40. The band 39 is split at a position 180° removed from the split in the band 40 so as to balance the load to which the drum 12 and its bearings are subjected when the bands 39 and 40 are energized to brake the drum 12.

The springs 46 are arranged between anchoring lugs 45 on the ends of the brake bands. For stopping forward rotation of the brake drum 12, that is, the direction indicated by the arrow in Fig. 2, the hydraulic brake cylinder 41 is employed to actuate the brake band 40, while the brake cylinder 42 is employed to actuate the brake band 39. For braking backward rotation of the drum 12, the cylinder 44 actuates the band 40 while the cylinder 43 actuates the band 39.

Cylinders 41, 42, 43 and 44 may all be alike. When oil under pressure from the pump 29, 31 is admitted to space 47, the piston 48 acts through the piston rod 49 to exert a force on the band lug 50 so as to contract the brake band 40 on the drum 12. Oil under pressure from the pump 29, 31 is supplied to each of the brake cylinders under the control of a control valve which is shown at the top of Fig. 2 and in section in Figs. 3, 4, 5 and 6.

At this point it will suffice to say that when the vehicle is being driven forwardly or reversely by the engine, the brake bands 39 and 40 are free of the drum so that the drum 12 will rotate in the same direction as the shaft 2 but at a greater speed, due to the fact that the sun gear 6 is held against rotation by means of the braking mechanism associated with the flywheel 1.

As shown in Figs. 1 and 7, brake shoes 68 are pivoted on anchor pins 89 to the web of the flywheel housing 35. Springs 90 hold the shoes 68 and the pistons 91 of the hydraulic cylinders 93 in their retracted position. The shoes 68 are nested within the flywheel 1 and the lining carried by the shoes 68, is cooperable with the drum surface provided on the inner periphery of the flywheel 1.

The hydraulic cylinders 93 are fixedly secured to the plate 33 or the web of the housing 35 to which the plate 34 is bolted. The pistons 91 are provided with reduced portions 92 which seat against the closed end of the cylinders 93 so as to determine the retracted positions of the pistons 91. Oil under pressure is supplied to the cylinders 93 through the tubes 80 for moving the pistons 91 so as to react on the free ends of the brake shoes 68 for actuating the same into engagement with the braking surface of the flywheel 1. The shoes 68 may be mounted so that they are self-energizing.

Fluid, such as oil, under pressure from the pump 29, 31 is adapted to be supplied to the hydraulic cylinders 93 for actuating the braking means for the flywheel 1. During forward or rearward movement of the vehicle when driven by the engine thereof, the control valve is constructed and arranged so that pressure from the pump 29, 31 is supplied to the braking means for the flywheel 1 for holding the same against rotation. This will thus cause the planet gears 7 to drive the ring gear 11 and the brake drum 12 faster than the shaft 2 and in the same direction.

The control valve shown at the top of Fig. 2 and also in Figs. 3, 4, 5 and 6, comprises a hollow cylindrical rotor 65 which is adapted to be turned by a lever 94 which is fixed to a shaft projecting from the rotor 65. This lever 94 is connected to the accelerator pedal or throttle 206 by suitable linkage, as illustrated in Fig. 9. The rotor 65 has a close working fit in the valve port sleeve 95, the end of which is closed by plugs 96 and 97. The ports in the sleeve 95 and rotor 65 are double, similar ports being arranged opposite each other for the purpose of balancing the valve to insure efficient and easy operation thereof. The sleeve 95 is fitted and sealed within a stationary outer sleeve 98, the sleeve 98 containing annular grooves 99 which serve to connect the two sets of ports in the sleeve 95 which are 180° apart.

In Fig. 3, which is a section through the control valve on the line 3—3 thereof, the valve sleeve or rotor 65 is shown in wide open throttle position. In this position the ports 87 do not communicate with the hollow interior of the valve 65. However, the ports 187 in the valve 65 are adapted to be aligned with the ports 87 when the throttle is in its closed position so that oil may flow freely from the oil supply pipe 86 through the ports 87, 187 in the interior of the valve 65 through the oil return pipe 76 back to the reservoir 57 in the bottom of the casing.

The tube 86 is connected to the pump 29, 31 in such a manner that it will be supplied with oil from the pump only when the pump is rotating backwardly. Thus, if the pump is rotating backwardly and the throttle 206 is open, the ports 87 and 187 will be out of alignment and pressure will be built up in the tubes 84 and 88 and the hydraulic cylinders 43 and 44 supplied thereby to apply the brake for the drum 12.

Figure 4:
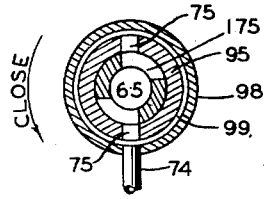

In Fig. 4, which is a section of the control valve taken along the line 4—4 thereof, the valve is also shown in a wide open throttle position. The ports 75 in the sleeve 95 are always open to the interior of the valve member 65 through the ports 175 therein when the throttle is open. If the pump is rotating forwardly which would correspond with the rotation of the gear 29 in the direction of the arrow indicated in Fig. 2 and if the throttle is open, oil from the pump will flow through the pressure regulating valve 73 and through the tube 74, ports 75 and 175, valve 65, and return tube 76 to the reservoir 57. When the throttle is closed the lever 94 will position the valve member 65 so that the ports 175 therein are out of alignment with the ports 75 in the sleeve 95, thereby causing pressure to build up in the brake tubes 77 and 78 for actuating the hydraulic cylinders connected thereto to apply the brakes to the drum 12.

Fig. 5 is a section through the control valve taken along the line 5—5 thereof. For all open positions of the throttle 206 the ports 66 in the sleeve 95 are in communication with the ports 67 therein by means of the communication provided by the reduced portion 100, of the valve rotor 65. In this position oil from the pump flows through the tube 64 and the ports 66 and 67 to the tube 80 and thence to the hydraulic cylinders 93 to apply the flywheel brakes. Whenever the pump 29, 31 is running in a forward direction and the throttle 206 is open, there will be pressure in the lines 80 to apply the flywheel brake due to the back pressure created by the valve 73.

Figure 6:
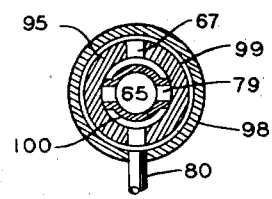

Fig. 6 is a section through the oil control valve taken on the line 6—6 thereof. Ports 79 in the valve member 65 and port 67 in the sleeve 95 will line up at closed throttle position so as to establish communication between the tubes 80 and 76, thereby relieving the fluid pressure in the brake cylinders 93 and allowing the return of oil to the reservoir through the line 76, thus releasing the flywheel brake. The adjustment of the regulating valve 73 (Fig. 2) controls the pressure in the brake tubes 64 and 80 and fluid coupling feed tube 70.

The oil pump 29, 31 will pump fluid under pressure in either direction, depending upon the direction in which it is driven by the ring gear 11. The direction of rotation of the ring gear 11 depends upon the forces applied to the planetary gear train under the various operating conditions. If the brake drum 12 and the pump gear 29 are turning forwardly, as indicated by the arrow in Fig. 2, the intake to the pump is through the port 51, drilled passage 52 in the plate 34, drilled passage 53 in the web of the casing, pipe 54, past check valve 55 and through intake pipe 56 from the reservoir 57. The check valve 58 at the upper end of the passages 82 and 85 is closed at this time.

Fluid under pressure from the pump is discharged through the port 59 into the passage 62 through which the oil flows upwardly into the passage 63 and through the tube 64 to the port 66 of the oil control valve. A branch line from the passage 62 also leads to the pressure regulating valve 73. If the throttle is open the valve 65 is in the position as shown and port 66 is in communication with port 67 and tube 80 and oil under pressure will thereby be supplied to the flywheel braking means 93, 68 for energizing the same.

The oil from the duct 63 also flows past the check valve 69 and through the tube 70 to the fluid coupling 15 via the grooved ring 71 and the drilled holes 72 in the hub 23. At the same time oil flows from the duct 62 to the pressure regulating valve 73 and thence through tube 74 to ports 75 in the control valve. If the throttle is open, the ports 75 and 175 are aligned and oil will flow through the control valve member 65 to the tube 76 and thence back to the reservoir 57. If the accelerator is released or closed, the ports 75, 175 will be out of alignment and the pressure will thence rise in the tubes 74 and in the tubes 77 and 78 and thereby subject the brake cylinders 41 and 42 to fluid under pressure for the purpose of actuating the braking means for the drum 12. Also when the throttle is closed, the ports 66 are closed and ports 67 are open to the two ports 79, thereby relieving the pressure in the flywheel brake line 80.

If the pump is rotating backwardly, the intake is through the port 59 and drilled passage 61, past the check valve 60 and the oil inlet from the reservoir therebelow. Both check valves 55 and 60 have pressure relief valves 81 which may be adjusted to the desired brake pressure. With the pump rotating backwardly, port 51 is now the pump outlet and oil will flow upwardly through the passage 82 in the plate 34, drilled passage 85 in the web of the casing 35 and through tube 86 to the port 87 of the control valve. If the throttle is closed, the ports 87 and 187 are aligned and oil will flow freely to the inside of the valve member 65 and thence through return tube 76 to the reservoir 57.

If the throttle is open, the ports 87 and 187 will be moved out of alignment and the fluid in the brake tubes 84 and 88 will be subjected to pressure so as to actuate the brake cylinders 43 and 44 for applying the brake to the drum 12. The brake tube 88 communicates with the drilled passage 53. At the same time fluid under pressure is delivered past the check valve 58 and through the tube 70 to the fluid coupling 15, 17.

Assuming that the vehicle is in motion at fifty miles per hour, the brake bands 39 and 40 will be released and the brake drum 12 and the pump gear 29 will be turning forward at a speed higher than the engine speed. In the construction as illustrated, I contemplate that it would be advisable to have the drum 12 and pump gear 29 rotate at a speed twenty-five per cent greater than that of the shaft when the flywheel 1 is stationary. Under these conditions the pump will be discharging fluid under pressure to the passage 62. Most of the oil being pumped will escape through the pressure regulating valve 73, line 74 and ports 75 and 175 because these ports are aligned when the throttle is open. A light pressure determined by the setting of the pressure regulating valve 73 is maintained in the tubes 64 and 80 so that the flywheel brake 68 is engaged and the flywheel 1 is not rotating.

If the driver desires to slow down or stop, the throttle will be released thereby permitting it to return to its closed position and thereby moving the control valve to its position corresponding with closed throttle position. This closes the ports 66 and opens the ports 67, releasing the pressure in the flywheel brake cylinders 93, thereby releasing the flywheel brake. At the same time the ports 175 move out of alignment with the ports 75. This causes pressure to build up in the brake tubes 77 and 78 and to apply braking force to the braking means for the drum 12. The amount of this braking force is controlled by the relief valve 81 on the check valve 60.

The braking force applied to the drum 12 will react on the internal gear 11. At this time the planet carrier 9 is being driven forward by the decelerating vehicle from which it receives its driving force through the fluid coupling 15 and 21. This driving force of the planet carrier 9 tends to drive both the internal gear 11 and the flywheel 1 forward, but since the internal gear 11 is retarded by the braking means for the drum 12, the reaction of the gears of the planetary gear train will drive the flywheel 1 forward at a speed materially greater than that of the carrier 9. The flywheel 1 is thus set in rapid forward rotation, thereby absorbing kinetic energy from the decelerating vehicle. The flywheel 1 may be going as fast as 15,000 R. P. M. when the vehicle stops.

With the construction as disclosed, when the flywheel 1 reaches a speed of five times that of the planet carrier 9, the internal gear 11 is no longer urged forward and the brake drum 12 will come to rest. Since the pump gears 29 and 31 will also come to rest with the gear 11, the brake bands 39 and 40 will be automatically released when the drum 12 stops while the flywheel 1 is free to keep spinning. As the planet carrier 9 continues to slow down with the decelerating vehicle, the reaction in the planetary gear train will begin to drive the internal gear 11 rearwardly. When the vehicle stops, the planet carrier 9 is revolving at engine idling speed and the brake drum 12 will be revolving backwardly at a speed equal to one-fourth of the flywheel speed minus engine idling speed.

If the flywheel is running forward 15,000 R. P. M. and the idling speed of the engine is 500 R. P. M., the brake drum will be turning backwardly 15,000 divided by 4 minus 500, which would give a speed of 3250 R. P. M. for the reverse speed of the drum 12. If the engine idle adjustment is set so that the engine will stop when the vehicle stops, the drum will be going backward at 3750 R. P. M.

With the drum 12 turning reversely, the pump 29, 31 will now be turning backwardly and the outlet therefrom will be through the passages 82 and 85, and tube 86, and the ports 87 and 187 will be aligned if the throttle is closed.

When it is desired to start the vehicle, opening of the throttle will move the ports 87 and 187 out of alignment, thereby causing pressure to build up in the brake tubes 84 and 88 so as to apply the braking means for the drum 12. The application of the brakes to the drum 12 will cause the internal gear 11 to slow down. Planet gears 7 can then react on the internal gear 11 so that the flywheel 1 which is spinning at a high rate of speed will drive the planet carrier 9 forward and thereby return to the drive system energy absorbed from the decelerating vehicle.

This energy may be employed to start the engine if stopped, and will also function to assist the engine to accelerate the vehicle. When the engine and the flywheel have accelerated the vehicle to a speed at which the flywheel can no longer help the engine, the pump 29, 31 will automatically reverse, releasing the brake bands 39 and 40 and applying the flywheel brake 68.

To determine to what velocity the car starting from rest will be accelerated by the flywheel:
Let $M$ = mass of the car
$V$ = velocity to which the car will be accelerated
$m$ = mass of flywheel rim
$r$ = mean radius of flywheel rim
$v$ = velocity of flywheel at mean radius.

The kinetic energy E of the car will be $MV^2/2$.
The kinetic energy of the flywheel rim is $mv^2/2$.
Neglecting friction, all of the energy of the flywheel will be transferred to the car so:

$$MV^2 = mv^2$$

Let $W$ = weight of the loaded car
$w$ = weight of flywheel rim.

Then $$(W/g)V^2 = (w/g)v^2$$

Since $g$ the acceleration of gravity is the same for both:

$$WV^2 = wv^2 \text{ or } V = \sqrt{wv^2/W}$$

If $W$ = 5,000 lbs.
$w$ = 56 lbs.
$r$ = 6¼ inches
Flywheel speed = 15,000 R. P. M.
$v = 2\pi 6¼'' \times 15,000 = 592,000'' = 49,300$ ft./min.
$v = 9.35$ miles/min. = 560 miles per hour
$V = \sqrt{56 \times 560^2/5,000} = \sqrt{3,512} = 59$ miles per hour.

About 50% of the flywheel energy will be lost in the brake bands 39 and 40, so that the car will be accelerated to about 30 M. P. H. by the flywheel alone.

This will provide phenomenal car performance even when starting in high gear. Except for pulling long grades steeper than 15%, it would seldom be necessary to use the transmission gears: If the flywheel speed is only 6,000 R. P. M. due to the car having been brought to a stop gradually, there would still be enough energy in it to accelerate the car to 12 M. P. H.

Neutral valve 110 is for the purpose of starting the flywheel spinning by engine power while the car is at rest. With the transmission in gear, this valve is in the position shown in Fig. 2 and provides uninterrupted communication through tubes 64 and 74 to the control valve. However, when the transmission is shifted to neutral, rotor 111 which is connected to the gear shift mechanism, is rotated enough to close both 64 and 74. With 64 closed the flywheel brake is inoperative; and with 74 closed, forward rotation of the pump causes the pressure to rise in 77 and 78 applying brake bands 39 and 40. Thus it is possible for the driver to put the transmission in neutral and start the flywheel in rapid rotation by speeding up the engine. The power thus stored in the power reclaimer is then available to assist the engine in starting the vehicle.

A further object of this invention is to provide a means of storing up power from the engine while the vehicle is at rest and later using this accumulated power for assisting the engine in starting the vehicle.

To summarize briefly the operation of the power reclaimer, reference is made to Figures 10 and 11. Figure 10 is a simplified schematic diagram which illustrates the relation of the power reclaimer to the drive system more clearly than the refined design shown in Figure 1. Shaft 2 extends from the engine flywheel 26 directly through the center of the power reclaimer assembly to the clutch or fluid coupling 15 of the vehicle. Planet carrier 9 is rigidly attached to shaft 2. This is the only connection between the power reclaimer and the vehicle drive system.

As previously described in connection with Figure 1 (and now with reference to Figure 10) when the engine alone is driving the vehicle through shaft 2, coupling 15 and transmission 202, brake 68 is on and brakes 39 and 40 are off. Therefore, flywheel 1 and sun gear 6 are stationary. Planet carrier 9 revolving with shaft 2 causes planet gears 7 to roll around sun gear 6, driving ring gear 11, brake drum 12, and pump gear 29 in a forward direction.

When the throttle is closed, brake 68 releases and brakes 39 and 40 retard the motion of brake drum 12 and ring gear 11. Then planet carrier 9 through gears 7 and 6 applies an accelerating force to flywheel 1. Flywheel 1 begins to revolve rapidly in a forward direction gaining mementum and absorbing energy from the decelerating vehicle. When it reaches a certain speed in relation to the planet carrier 9, ring gear 11 comes to a stop. This stops pumps 29 and 31, relieving the pump pressure and automatically releasing brakes 39 and 40. As the vehicle continues to slow down, ring gear 11, brake drum 12, and pump gears 29 and 31 begin to revolve backwards. When the vehicle stops, the flywheel 1 continues to spin forward and the brake drum 12 continues to revolve backward. Now when the accelerator is depressed to start the vehicle, brakes 39 and 40 come on again and the energy in the flywheel is transmitted back to shaft 2. Brakes 39 and 40 stay on until the accelerating vehicle and the decelerating flywheel reach a point in their relative speeds causing another reversal of pump direction. Then brakes 39 and 40 release and brake 68 engages, completing the cycle.

Figure 11 is a schematic diagram of the automatic mechanism which controls brakes 68, 39 and 40. Rotor 65 in valve 95 is connected by means of lever 94 to the accelerator pedal. It is shown in open throttle position. When pump gear 29 is turning in a forward direction as indicated, the intake is from reservoir 57 through passage 56, check valve 55 and passages 53, 82 and 51. Oil is being pumped through passages 59 and 62 to the pressure regulating valve 73. Oil from the valve 73 is returning to reservoir 57 via tube 74, valve 110, port 75, port 175, the drilled hole in rotor 65, and tube 76. Pressure is being supplied to brake 68 via tube 64, valve 110, port 66, port 67, tube 80 and piston 91 in cylinder 93. Thus brakes 39 and 40 are off and brake 68 is on, holding the flywheel stationary.

Upon closing the throttle, valve rotor 65 turns, closing ports 75 and 66 and causing hole 79 to register with port 67, also causing hole 187 to register with port 87. This releases brake 68 because port 67 is open to discharge through 79 and 76. Also the closing of 75 causes pressure to build up in tubes 74, 77 and 78 applying brakes 39 and 40 by means of cylinders 41 and 42. The amount of brake pressure on drum 12 is limited by relief valve 81. The retarding effect of brakes 39 and 40 causes the vehicle to drive the flywheel 1 by means of planet carrier 9 and gears 7, 11, and 6.

As the vehicle slows down the flyweel speeds up until its speed becomes five times the engine speed. Then the pump reverses, relieving the pressure in tube 59 and releasing brakes 39 and 40. Flywheel 1 continues to spin forward when the vehicle is stopped, driving ring gear 11 and pump gear 29 backward. All brakes are now off because port 87 is open and oil is circulating through the pump under atmospheric pressure only.

When the accelerator is depressed for starting the vehicle, 87 closes and pressure builds up in tubes 86, 84 and 88 applying brakes 39 and 40 by means of cylinders 43 and 44. The momentum of the flywheel then reacting on gear 11 helps accelerate the vehicle and will continue to do so until the pump again reverses.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

1. In a power reclaimer for a motor propelled vehicle, a drive system including a power shaft for transmitting power from the motor to the propelling means of the vehicle, a control for regulating the operation of said motor, energy absorbing and storing means operably associated with said drive system and controlled by said regulating control and operable for absorbing and storing kinetic energy from the drive system during coasting movement of said vehicle when said regulating control is in a retarded position, said means including a flywheel and a planetary gear train having planet gears connected to said power shaft and its sun gear to said flywheel and operable for drivingly connecting said flywheel to said drive system at the time coasting movement of said vehicle commences so as to accelerate said flywheel and thereby absorb and store kinetic energy from said vehicle, and means controlled by said regulating control for releasing said stored energy from said flywheel to said drive system when said regulating control is arranged in another position.

2. In a power driven device, a drive system including a power reclaimer, a power shaft, a motor connected to said drive system for applying torque thereto so as to drive said device, a control for regulating said motor, energy absorbing and storing means operably associated with said drive system and operable for absorbing and storing kinetic energy from the drive system upon deceleration thereof, said energy absorbing and starting means comprising a flywheel, a sun gear of a planetary gear train connected to said flywheel, a brake drum, a ring gear of said planetary gear train connected to said brake drum, planet gears of said planetary gear train connected to the said power shaft, first braking means operable for holding the flywheel against rotation when the motor is propelling said device thereby to drive said drum, second braking means for holding said brake drum against rotation thereby to accelerate said flywheel, and a control for said first braking means coordinated with the position of said motor control so that said flywheel braking means is energized when said motor control is arranged so that the motor is propelling the device and so that said flywheel braking means is deenergized when said motor control is arranged so that the motor is not propelling the device.

3. In a power reclaimer for a motor propelled vehicle, a drive system including a power shaft for transmitting power from the motor of the vehicle to the propelling means thereof, a throttle control for controlling the speed of said motor, energy absorbing and storing means operably associated with said drive system and operable for absorbing and storing kinetic energy from the drive system during deceleration of the vehicle, said means comprising a flywheel, a sun gear of a planetary gear train connected to said flywheel, a brake drum, a ring gear of said planetary gear train connected to said brake drum, planet gears of said planetary gear train connected to the power shaft, a fluid pump connected to said drum so as to be driven therewith, braking means actuated by fluid pressure from said pump and operable for holding the flywheel against rotation, braking means actuated by fluid pressure from said pump and operable for holding said brake drum against rotation, a control valve associated with the discharge from said pump and operable for controlling the application of fluid pressure to said braking means, said control valve being connected to said throttle so as to be positioned thereby, said control valve being constructed and arranged so as to supply fluid pressure from said pump to said flywheel braking means when the throttle is open and the vehicle is being propelled by the motor thereof, said control valve being constructed and arranged so as to shut off the supply of fluid pressure from said pump to said flywheel braking means when the throttle is closed and simultaneously to supply fluid pressure to said drum braking means for actuating the same to stop the rotation of said drum and ring gear whereby said planetary gear train will function to accelerate said flywheel, the deceleration of said vehicle due to the closing of said throttle causing said ring gear and brake drum to turn in a reverse direction after said flywheel is accelerated, said control valve being constructed and arranged to supply fluid under pressure from said pump to said drum braking means when said drum and ring gear are turning reversely and said throttle is opened so as to brake the reverse rotation of said drum and ring gear and thereby cause a reaction in said planetary gear train which drives the power shaft forward thereby to utilize the energy stored in said flywheel for accelerating said vehicle.

4. In a power reclaimer for a power driven device, power means for driving asid device, energy storing means constructed and arranged to absorb and store kinetic energy selectively from said power means or said device during the deceleration thereof while absorbing substantially no kinetic energy during any period of time when said power means is accelerating said device, and hydraulically actuated control means operable automatically for releasing to said driving means the energy stored in said energy storing means thereby to assist in the subsequent acceleration of the said device.

5. A power reclaimer for a power driven device according to claim 4 and further characterized in that the said power means includes a power means control which is adapted to be advanced and retarded selectively for regulating the operation of said power means and said hydraulically actuated control means is coordinated with the position of said power means control to release the energy stored in said energy storing means upon advancing of the power means control after deceleration of said device.

6. A power reclaimer for a power driven device according to claim 5 and further characterized in that the power means for driving said device is a motor connected with a drive system and having a throttle control for regulating its speed and further characterized in that said hydraulically actuated control means is coordinated with the position of said throttle control whereby upon opening the throttle control after deceleration of said device due to closing of said throttle control, said energy storing means is operated to deliver its stored energy to the said drive system.

7. In a power reclaimer for a motor propelled device having a propelling means and a drive system operable for transmitting power from the motor of said device to said propelling means, energy storing means constructed and arranged to absorb and store kinetic energy from said device during the deceleration thereof while absorbing substantially no kinetic energy during any period of time when said propelling means is accelerating said device, and control means operable for releasing the energy stored in said energy storing means to said drive system for accelerating said device.

8. In a power reclaimer for a motor propelled device having a motor and a drive system, means constructed and arranged to act on said drive system for decelerating said device and including energy storing means constructed and arranged to absorb and store kinetic energy from said device selectively during the deceleration thereof, or from the motor when the device is at rest, and control means operable when the device is motor-driven for releasing to said drive system the energy stored in said energy storing means, said control means being further operable to restrain said device from receiving kinetic energy during such periods of time when the device is motor driven to an accelerating rate of speed.

9. In a power reclaimer as claimed in claim 8, and further characterized in that a throttle control is provided to selectively control the operation of the motor and the control means for releasing to the said drive system the energy stored in said energy storing means.

10. In a power reclaimer as claimed in claim 9, and further characterized in that said control means includes hydraulically actuated controls which are regulated by the operation of said throttle control to permit said energy storing means to absorb energy when the device is at rest or during deceleration or coasting of the device and to release its stored energy to the device when desired during periods of acceleration thereof.

11. In a power reclaimer for a vehicle having a drive system and a motor connected thereto for applying torque thereto to propel said vehicle, a throttle control for said motor, a flywheel, means including a planetary gear train having at least one of its gears connected to said drive system and at least another of its gears connected to said flywheel, and control means operable upon closing of the said throttle control for drivingly connecting said flywheel to said drive system to accelerate said flywheel and thereby absorb and store kinetic energy from said vehicle during deceleration thereof and operable upon opening the said throttle control during acceleration of said vehicle for releasing to said drive system the energy stored in said flywheel, said control means being further operable to prevent said flywheel from absorbing kinetic energy when said throttle control is open during acceleration of said vehicle.

12. A power reclaimer comprising a flywheel mounted for rotation about a rotatable shaft, step up gearing and clutching means connecting said flywheel and said shaft to effect an accelerated rotation of said flywheel to absorb and store energy from said shaft when excess energy is delivered to said shaft and, when said drive shaft is decelerated, said gearing and clutching means cooperating with said flywheel to deliver the absorbed and stored energy to said shaft when acceleration thereof is desired, said gearing and clutching means cooperating with said flywheel and shaft to prevent said flywheel from absorbing kinetic energy when said shaft is being accelerated.

13. A power reclaimer as claimed in claim 12 and further characterized in that said drive shaft is a part of the power transmission system of a vehicle driven by a prime mover and further characterized in that control means controlling the operation of said clutch means is provided for selectively enabling the energy to be stored in said flywheel either during the deceleration of said vehicle or during operation of the prime mover while the vehicle is stationary.

14. A power reclaimer as claimed in claim 13 and further characterized in that said flywheel exerts a braking effort on the vehicle during the deceleration thereof.

15. In an automotive vehicle having a rotatable driving shaft and a throttle control, a power reclaimer for conserving energy comprising a flywheel mounted for rotation about said shaft, a planetary gear train connecting said flywheel and shaft, first brake means for retarding said flywheel against rotation, second brake means operatively associated with said planetary gear train, a liquid pump operatively associated with said planetary gear train and responsive to braking action of said second brake means, each of said brake means being adapted to be actuated by liquid under pressure from said pump, control means responsive to movements of said throttle control for controlling the liquid pressure from said pump to each of said brake means, said control means being responsive to closing of said throttle to pressure actuate said second brake means while releasing said first brake means and operative to subsequent opening of said throttle to release said second brake means while pressure actuating said first brake means, whereby said flywheel will absorb and store kinetic energy when said vehicle is being decelerated and will deliver energy to said shaft when said vehicle is subsequently accelerated or restarted from a stopped position.

16. In an automotive vehicle having a rotatable driving shaft and a throttle control, a power reclaimer for conserving energy comprising a flywheel mounted for rotation about said shaft, a planetary gear train including a set of planet gears connected for operable rotation to said driving shaft, a sun gear connected to said flywheel, and a rotatable ring gear, first brake means responsive to liquid under pressure for retarding said flywheel against rotation, second brake means responsive to liquid under pressure for retarding rotation of said ring gear, a reversible liquid pump rotatable with said ring gear for actuating said brake means, and a liquid control means responsive to said throttle control for actuating and releasing each of said brake means as necessary whereby said flywheel will absorb kinetic energy from said shaft during the deceleration of said vehicle resulting from closing said throttle and said flywheel will deliver said kinetic energy back to said shaft during the acceleration of said vehicle resulting from reopening said throttle, said liquid control means being operative to pressure actuate said first brake means and release said second brake means when said flywheel has insufficient kinetic energy available to drive said shaft, whereby the flywheel will not absorb kinetic energy from the vehicle under starting or accelerating conditions.

ALBERT O. ROBERTS.

REFERENCES CITED

The following references are of record in the file of this patent:

UNITED STATES PATENTS

| Number | Name | Date |
| --- | --- | --- |
| 2,118,590 | Chilton | Mar. 24, 1938 |
| 2,196,064 | Erban | Apr. 2, 1940 |
| 2,387,398 | Hruska et al. | Oct. 23, 1945 |
| 2,443,770 | Kasschau | June 22, 1948 |

FOREIGN PATENTS

| Number | Country | Date |
| --- | --- | --- |
| 559,873 | Great Britain | Mar. 8, 1944 |